(12) United States Patent
Krauhausen et al.

(10) Patent No.: US 9,304,204 B2
(45) Date of Patent: Apr. 5, 2016

(54) METHOD AND DEVICE FOR OPTICALLY MEASURING THE INTERIOR OF A PIPE

(71) Applicants: Michael Krauhausen, Aachen (DE); Ruediger Neugebauer, Duesseldorf (DE); Manfred Kolbe, Moenchengladbach (DE); Manfred Topueth, Wassenberg (DE); Norbert Pesch, Moenchengladbach (DE); Alexander Schulze, Dortmund (DE); Jochen Vochsen, Erkelenz (DE); Heinrich Oberwelland, Erkelenz (DE)

(72) Inventors: Michael Krauhausen, Aachen (DE); Ruediger Neugebauer, Duesseldorf (DE); Manfred Kolbe, Moenchengladbach (DE); Manfred Topueth, Wassenberg (DE); Norbert Pesch, Moenchengladbach (DE); Alexander Schulze, Dortmund (DE); Jochen Vochsen, Erkelenz (DE); Heinrich Oberwelland, Erkelenz (DE)

(73) Assignee: SMS MEER GMBH, Moenchengladbach (DE)

( * ) Notice: Subject to any disclaimer, the term of this patent is extended or adjusted under 35 U.S.C. 154(b) by 0 days.

(21) Appl. No.: 14/407,846

(22) PCT Filed: Aug. 8, 2013

(86) PCT No.: PCT/EP2013/002375
§ 371 (c)(1),
(2) Date: Dec. 12, 2014

(87) PCT Pub. No.: WO2014/023430
PCT Pub. Date: Feb. 13, 2014

(65) Prior Publication Data
US 2015/0146216 A1    May 28, 2015

(30) Foreign Application Priority Data
Aug. 10, 2012   (DE) .......................... 10 2012 015 807

(51) Int. Cl.
| | | |
|---|---|---|
| *G01B 11/30* | (2006.01) | |
| *G01S 17/89* | (2006.01) | |
| *B21C 51/00* | (2006.01) | |
| *G01B 11/12* | (2006.01) | |
| *G01B 11/24* | (2006.01) | |
| *G01S 17/88* | (2006.01) | |
| *G01B 11/00* | (2006.01) | |
| *G01B 11/14* | (2006.01) | |
| *G01S 17/66* | (2006.01) | |

(52) U.S. Cl.
CPC .................. *G01S 17/89* (2013.01); *B21C 51/00* (2013.01); *G01B 11/002* (2013.01); *G01B 11/12* (2013.01); *G01B 11/14* (2013.01); *G01B 11/24* (2013.01); *G01B 11/2441* (2013.01); *G01S 17/66* (2013.01); *G01S 17/88* (2013.01)

(58) Field of Classification Search
CPC ........ B21C 51/00; B23K 9/095; G01B 11/12; G01B 11/24; G01B 11/002; G01S 17/89
USPC .................... 356/610, 601, 614, 237.2–237.6
See application file for complete search history.

(56) References Cited

U.S. PATENT DOCUMENTS

| | | | | |
|---|---|---|---|---|
| 5,435,478 | A * | 7/1995 | Wood .................. | B23K 9/0286 219/130.01 |
| 6,417,488 | B1 * | 7/2002 | Takeuchi ............. | B23K 9/0284 219/130.01 |
| 8,842,297 | B2 * | 9/2014 | Storksen ........... | G01B 11/0616 250/559.22 |
| 9,176,052 | B2 * | 11/2015 | Tunheim ................ | G01N 21/31 |
| 2008/0084558 | A1 | 4/2008 | Thompson | |
| 2008/0218768 | A1 | 9/2008 | Kodama | |
| 2009/0237678 | A1 * | 9/2009 | Brzoska .............. | F27D 21/0021 356/608 |
| 2011/0100965 | A1 | 5/2011 | Yano | |

FOREIGN PATENT DOCUMENTS

| DE | 102005012107 A | 9/2006 |
|----|----------------|--------|
| DE | 102011009660 A | 8/2012 |
| KR | 20110094449 B | 9/2011 |

\* cited by examiner

*Primary Examiner* — Roy M Punnoose
*Assistant Examiner* — Isiaka Akanbi
(74) *Attorney, Agent, or Firm* — Andrew Wilford

(57) ABSTRACT

The invention relates to a method and a device for optically measuring the interior of a seamless pipe which is manufactured by rolling or of a pipe which is welded with a longitudinal seam and is manufactured from sheet-metal plates shaped to form half-shells or from a shaped sheet-metal plate or from a metal strip which is unwound from a coil, comprising a sensor means (9) which emits a laser beam (10) in the interior of the pipe (3). In such a method and device, an internal measurement of seamless pipes or pipes which are welded with a longitudinal seam is to be provided with which it is easily possible to determine and model precisely the ovalness and straightness of the pipe (3) in a station. For this purpose there is provision that the sensor means (9) is moved horizontally through the pipe (3), wherein the internal contour (15) of the pipe (3) is measured in that a laser tracker (12) which is positioned at the end of the travel path follows, with its laser beam (13), the respective position of the sensor means (9) in the space of the pipe (3) and senses deviations of the sensor means (9) from straightness.

5 Claims, 1 Drawing Sheet

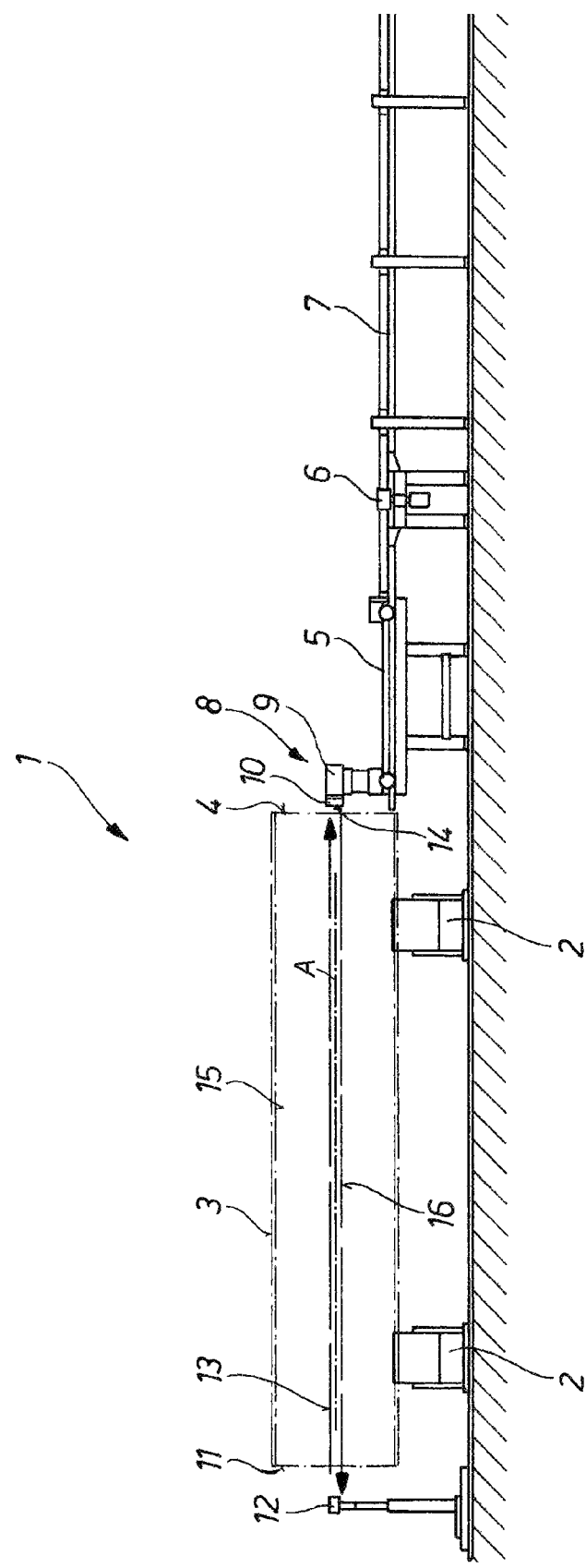

METHOD AND DEVICE FOR OPTICALLY MEASURING THE INTERIOR OF A PIPE

CROSS REFERENCE TO RELATED APPLICATIONS

This application is the US-national stage of PCT application PCT/EP2013/002375 filed 8 Aug. 2013 and claiming the priority of German patent application 102012015807.6 itself filed 10 Aug. 2012.

The invention relates to a method and an apparatus for optically internally surveying a seamless pipe manufactured by rolling, or of a pipe that is welded with a longitudinal seam and is manufactured from sheet metal plates shaped to form half shells or from a shaped sheet metal plate or from a metal strip unwound from a coil, comprising a sensor that emits a laser beam inside the pipe.

For determining straightness, diameter and out-of-roundness of a pipe it is known to use contactless measuring devices, for example laser measurement systems that survey the pipe from the outside with a plurality of lasers at defined spacings, ten or more laser sensors distributed over the length of the pipe being used.

For this purpose, the pipe needs to be rotated on a rotary support. Straightness and potential ovality are calculated from the resulting measurements. Apart from the fact that complex batteries of lasers have to be set up in a laborious manner or are required, it is not possible therewith to survey the inner surface of the pipe, and in the case of a pipe having a longitudinal weld, it is not possible to also measure the existing internal weld along the entire length of the pipe.

DE 10 2011 009 660 provides an apparatus and a method of shaping flat products so as to form open-seam pipes or tubular pre-products that enable continuous inspection and ultimately also automation of the process itself largely independent of the thickness and the material properties of the flat product to be shaped.

For this purpose, a light source and at least one receiver are connected to at least one internal shaping tool and serve for mapping the open-seam shape or the inner surface of the tubular pre-product. A laser source and a laser detector are preferably used here.

Thus, an apparatus is provided that, by using precision devices, permits detailed inspection of the shaping steps up to the final inspection of the inner surface of the cross-section of the open-seam pipe. Depending on the measurement results obtained, each local shaping step or the entire shaping process can be inspected immediately preferably online and automated, and on-the-fly readjustment of the settings of the machining tools can be carried out, if necessary.

This laser-based internal survey allows monitoring of the steps of the shaping process, i.e., the inner surface of the open-seam pipe can be surveyed at a particular position over the length of the pipe; however, this is explicitly only possible in a pipe-forming press that has an internal shaping tool and in which an open-seam pipe is produced by radially shaping a flat product.

In the manufacture of a seamless pipe where a bloom is rolled over a mandrel and/or a mandrel bar, or in the manufacture of a pipe welded with a longitudinal seam, for which, for example, two half shells shaped from sheet metal plates are welded together, the known laser-based measurement of the inner surface cannot be used.

The reason for this is that, on the one hand, continuous measurement of the inner surface during the rolling process is impossible due to the nonexistent clearance and, of course, due to the extremely high temperatures. On the other hand, no internal shaping tool is used when fitting the two half shells together and subsequently welding them together.

It is therefore an object of the invention to provide a method and an apparatus of the above-described type for internally surveying seamless pipes or pipes welded with longitudinal seams, by means of which it is possible in a simple manner to determine and precisely map the ovality and straightness of the pipe in one station.

This object is achieved with a method according to the invention in that the sensor is moved horizontally through the pipe such that the inner surface of the pipe is surveyed and a laser tracker that is positioned at the end of the travel path tracks with its laser beam the position of the sensor inside the pipe and senses deviations of the sensor from straightness.

The sensor, preferably a sensor head turning or rotating permanently about its own axis, has a laser source and a laser detector via which the inner surface is detected in steps or even continuously during an axial forward or backward movement of the sensor within the pipe, and thus the roundness or ovality of the pipe is measured and the inner surface of the pipe can be determined by triangulation or a time-of-flight method.

When the sensor provided with the laser source and the laser tracker moves through the pipe, the laser beam of the laser tracker automatically tracks the actual position of the sensor while the alignment of the laser tracker is measured by rotary encoders at two angles. The laser tracker always senses the exact X-, Y-, Z-position of the sensor in space and knows where the center of space is.

If the spacing between inner wall and the sensor changes, for example if ovality with respect to the outer surface of the pipe or a curvature or bend of the pipe with respect to its longitudinal axis occurs or the sensor departs from the ideal path, such a change in spacing is measured by the laser means that, through a combination with the laser spacing measurement, senses precisely the position of the sensor with respect to the fixed position of the laser tracker.

A complete 3D measurement of the pipe, in particular of large pipes, by sensing the entire cross-section and the longitudinal form can be achieved by one mapping station.

In addition to the precise surveying of the internal geometry of the pipe, it is preferably also possible with the above-described method to inspect the shape and in particular any gaps in the internal weld of a pipe welded with a longitudinal seam.

The object of the invention is attained by an apparatus that is characterized in that the sensor is mounted on a carriage that moves through the pipe and that a laser tracker is provided at that front end of the pipe that is opposite to the rear end where the carriage is inserted, and a laser beam of the laser tracker is directed at a reflector provided on the sensor.

The carriage, for example designed as a dolly or slide, is preferably moved axially into the pipe to be surveyed by a push rod as a pusher that can be actuated by a hydraulically/pneumatically powered cylinder or a motor, while the pipe is axially nondisplaceably supported on the bearing blocks that fit complementarily to the pipe diameter. According to the invention, a rotating sensor head, optionally a plurality of laser light section sensors, is preferred as a sensor.

During the linear feed movement of the carriage carrying the sensor head, the sensor head provided with the laser source and with the laser detector rotates continuously about its own axis and the laser beams emitted by the laser source continuously scan over the entire internal cross-section and optionally over a weld in the pipe. The laser beam continuously tracks the position of the reflector. Thus, a coordinate-based determination of the position of the sensor head within the pipe takes place, so that on the one hand a changing spacing of the inner surface from the sensor head and on the other hand the changing position between the laser tracker and the sensor head or sensor that moves forward and backward horizontally via the carriage is measured.

Detecting and evaluating the laser beams scattered back from the inner surface and/or the weld of the pipe is carried out by a receiver and preferably by a converter, so that the inner surface can be mapped.

By combining the laser surveying by the sensor and the coordinate-based determination of the position with the laser tracker, a 3D map of the inner pipe shape is obtained that can be displayed on a monitor.

Further features and details of the invention are apparent from the claims and the following description of an embodiment of the invention that is schematically illustrated in the sole FIGURE of the drawing.

The drawing shows a mapping station 1 for surveying the inner surface of seamlessly rolled pipes or pipes welded with a longitudinal seam, the mapping station being downstream of the manufacturing line.

The mapping station 1 comprises two bearing blocks 2 forming seats shaped to the outer diameter of a pipe 3 to be measured that firmly rests on the them.

On the right front end 4 of the pipe 3 there is a transport slide 5 that can be displaced axially via a push rod 7 driven by a motor 6. A laser measurement system 8 that has a sensor head 9 rotating about its own axis is mounted on the transport carriage 5. The rotating sensor head 9 preferably operates with a laser diode that emits a laser light point or a laser light beam 10. Furthermore, an unillustrated receiver is integrated in the sensor head 9.

A vertically positionable laser tracker 12 is fixed at the left front end 11 of the pipe 3 and emits via a tracking interferometer a laser beam 13 that is reflected back to the laser tracker 12 by a reflector 14 on the sensor head 9, as indicated by arrow 16.

For optical and contactless surveying of the inner surface 15 of the pipe 3, the transport slide 5 carrying the laser measurement system 8 is moved horizontally axially into the pipe 3 via the push rod 7 driven by the motor 6. At the same time, the sensor head 9 rotates about its own axis so that the laser light beam 10 emitted by the laser diode travels continuously or in steps over the inner surface 15, for example for scanning the internal weld of a pipe welded with a longitudinal seam. The laser light point or laser light beam 10 reflected from the inner wall and thus from the inner surface 15 is received and measured by a position detector in the sensor head 9.

The received and measured laser light point or laser light beam 10 can then be imaged, for example on an optical image capturing unit so as to display the inner surface 15 of the pipe 3.

For continuously tracking the rotating sensor head 9 and for determining the coordinate-based position thereof within the pipe 3, the laser tracker 12 is located in a fixed position axially aligned with the sensor head 9 whose the laser beam 13 tracks the reflector 14 of the sensor head 9 so that deviations of the sensor head 9 from axial alignment are sensed.

Due to the continuous target tracking of the sensor head 9 and by continuously sensing the spacing of the sensor head 9 relative to the laser tracker 12, a three-dimensional measurement and representation of the pipe 3 on an optical image capturing unit is possible, providing information about straightness or curvature and roundness or ovality of the pipe 3.

REFERENCE LIST

1 mapping station
2 bearing block
3 pipe
4 right front end
5 carriage/transport slide or similar vehicle
6 motor
7 push drive/push rod
8 laser measurement system
9 sensor/sensor head
10 laser light beam
11 left front end
12 laser tracker
13 laser beam
14 reflector
15 inner surface
16 arrow

The invention claimed is:

1. A method of optically internally surveying a seamless pipe manufactured by rolling, or of a pipe welded with a longitudinal seam and manufactured from sheet metal plates shaped to form half shells, from a shaped sheet metal plate, or from a metal strip unwound from a coil, the method comprising the steps of:
  moving a sensor that emits a laser beam inside the pipe horizontally through the pipe;
  scanning with the sensor as it moves through the pipe an inner surface of the pipe;
  determining with a laser tracker positioned stationarily outside the pipe at the end of the travel path the position of the sensor inside the pipe along and transverse to an axis of the pipe and
  forming a survey of the inner surface of the pipe by combining outputs of the sensor and laser tracker.

2. The method according to claim 1, wherein in the case of a pipe welded with a longitudinal seam, the shape of the internal weld is measured at the same time by the movable sensor.

3. An apparatus for optically internally surveying a seamless pipe manufactured by rolling, or of a pipe that is welded with a longitudinal seam and is manufactured from sheet metal plates shaped to form half shells, from a shaped sheet metal plate, or from a metal strip unwound from a coil, comprising a sensor that emits a laser beam inside the pipe, in particular for carrying out the method according to claim 1, wherein
  the sensor is mounted on a carriage that moves through the pipe and that a laser tracker is provided at the front end of the pipe opposite to the insertion end of the carriage, and the laser beam of the laser tracker communicates with a reflector provided on the sensor.

4. The apparatus according to claim 3, wherein the sensor is a rotatable sensor head.

5. The apparatus according to claim 3 or claim 4, wherein the carriage is moved by a push drive.

* * * * *